Jan. 30, 1934.  E. E. KELLEMS  1,945,195
METHOD OF AND APPARATUS FOR MAKING CABLE GRIPS
Filed July 24, 1930  2 Sheets-Sheet 1
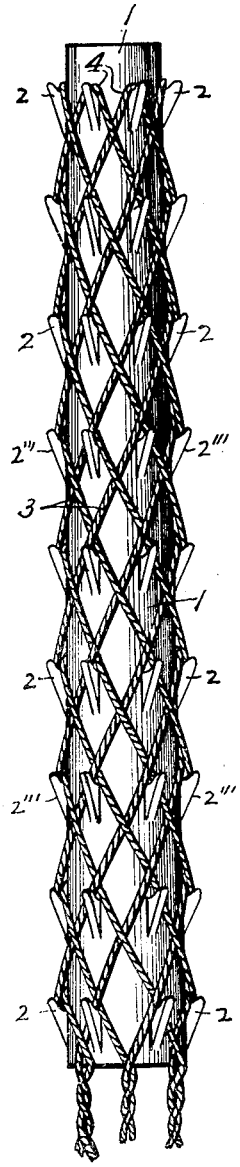
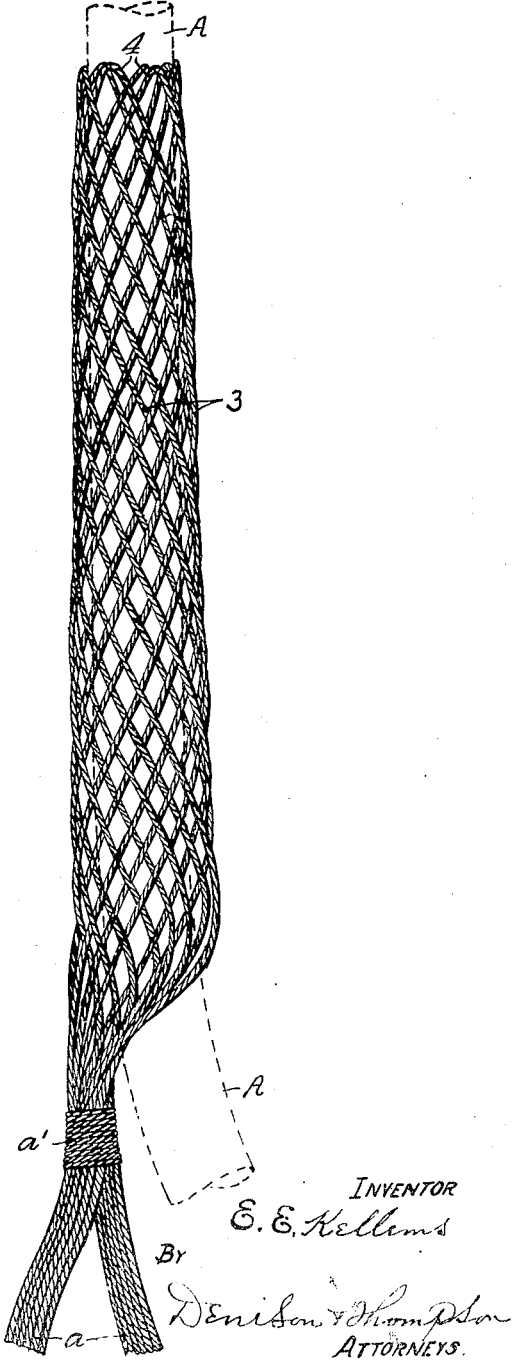

Jan. 30, 1934.   E. E. KELLEMS   1,945,195
METHOD OF AND APPARATUS FOR MAKING CABLE GRIPS
Filed July 24, 1930   2 Sheets-Sheet 2
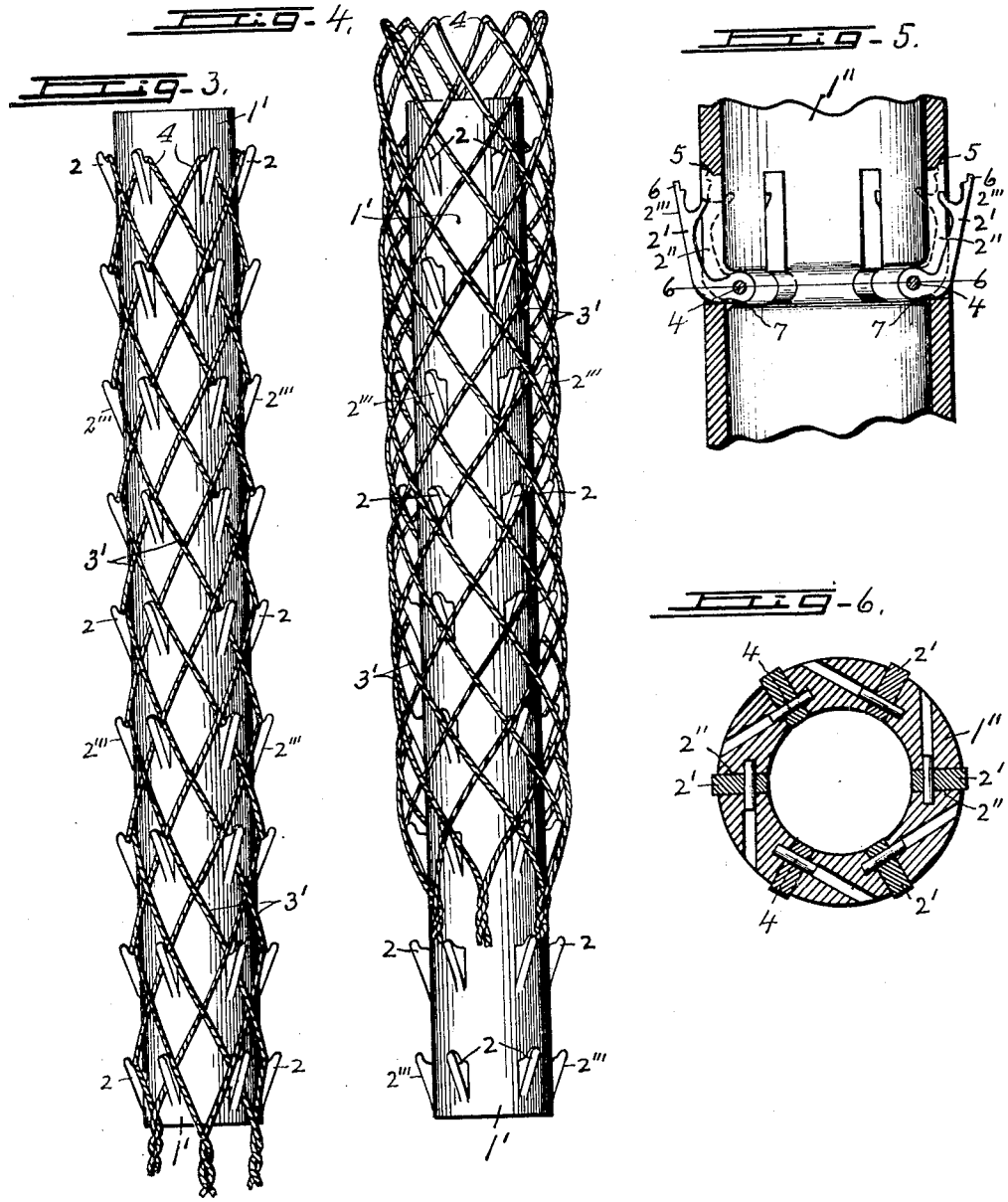

Patented Jan. 30, 1934

1,945,195

UNITED STATES PATENT OFFICE 1,945,195

METHOD OF AND APPARATUS FOR MAKING CABLE GRIPS

Edgar E. Kellems, New York, N. Y.

Application July 24, 1930. Serial No. 470,309

4 Claims. (Cl. 140—92.1)

This invention relates to the manufacture of woven wire tubes commonly known as cable grips capable of being expanded and contracted radially by endwise compression and extension respectively so that when compressed endwise and thereby expanded radially it may be placed over and upon and moved along a cable or similar object and then extended lengthwise to contract the same radially upon said object for frictionally binding the same thereon and thus permitting the cable with the conduit therein to be drawn endwise or supported from one end of the grip.

The strands used in the manufacture of these cable grips are usually woven around and upon the periphery of a mandrel of predetermined length and diameter depending somewhat upon the diameter of the cable or other article to which it is to be applied.

These mandrels are usually provided with shoulders projecting from the periphery thereof in uniformly spaced parallel lengthwise rows and also in uniformly spaced circumferential rows across which the strands are drawn in the usual manner for braiding or interweaving the strands one with the other, to produce a more or less symmetrical and uniform mesh in which the intersecting portions are relatively movable longitudinally and transversely to permit the radial expansion and contraction and also the axial compression and extension of the grip as previously mentioned.

It has been customary to construct the shoulders in the form of pins removably inserted in the sockets in the mandrel so that when the strands have been woven around the mandrel in tubular form it has been necessary to remove the pins to permit the removal of the woven grip.

Another method more recently practised is to form the shoulders upon rods or bars adapted to be removably supported upon the mandrel in such manner that when the strands were woven into tubular form around the mandrel it became necessary to withdraw the bars with the shoulders thereon axially from the mandrel to cause removal of the woven wire tube as shown in pending application, Serial No. 345,682, filed March 9, 1929, patented October 11. 1932, No. 1,881,659, which also shows and describes the rods upon which the shoulders are mounted as turnable about their respective axes to bring the shoulders within the inner periphery of the woven wire tube so that the latter could be removed endwise from the mandrel by simply turning the bars with the shoulders thereon about their respective axes.

These methods of displacing the shoulders to permit the removal of the woven wire tubes from their mandrels requires the expenditure of considerable time and labor and necessarily restricts the output for a given period of time.

The main object of my present invention is to avoid these objectionable practices by permanently affixing the shoulders to the mandrel and constructing them in such manner that when the strands are woven on the mandrel in the form of a tube the latter may be compressed endwise and thereby expanded radially to a degree sufficient to permit the woven wire tube to be stripped or slipped endwise in one direction over the protruding shoulders and thus removed from the mandrel without necessitating the displacement of any of the shoulders.

Furthermore these woven wire tubes are frequently used for drawing cables and analogous objects having more or less hard and smooth surfaces in which case the frictional grip of the woven wire tube upon said hardened surfaces is more or less unreliable in that it may permit the grip to slip endwise upon the cable.

Another object, therefore, of the invention, is to overcome this latter difficulty by forming the tubular grip on a tapered mandrel so that the grip per se will assume the same normal taper when completed with the cable receiving end somewhat smaller than its draft end whereby, when expanded radially by endwise compression, the smaller end of the tube may be slipped over and upon the cable or other article and the entire grip moved along said article until the latter extends beyond the ends thereof whereupon the endwise extension of the tubular grip will cause its smaller end to first grip the periphery of the article, while the remaining portions of the woven tube will gradually be brought into frictional engagement with the periphery of the article as the endwise extension of the tube continues, thereby assuring a more reliable frictional grip of all parts of the woven tube upon the article than has heretofore been practised, even though the surface of the article may be relatively hard.

Other objects and uses relating to specific parts of the device will be brought out in the following description:

In the drawings—

Figure 1 is a face view of one form of my invention showing a tapered mandrel with peripheral shoulders permanently and rigidly united thereto, together with a strand tube woven thereon.

Figure 2 is a side elevation of the woven wire tube shown in Figure 1 as applied to a cable or similar article, shown by dotted lines, the woven wire tube being extended to firmly grip the periphery of the cable.

Figure 3 is a face view of a modified form of my invention in which the mandrel is cylindrical, showing also the strand tube woven thereon.

Figure 4 is a face view of the device shown in Figure 3 except that the woven wire tube is compressed axially to expand the same radially beyond the outer edges of the shoulders in the act of stripping said woven wire tube from the mandrel.

Figure 5 is a fragmentary sectional view of another modified form of my invention in which the mandrel is cylindrical and the shoulders are pivoted to swing radially to and from a position beyond the periphery of the mandrel to facilitate stripping of the tube from the mandrel.

Figure 6 is a transverse sectional view taken in the plane of line 6—6, Figure 5.

The device shown in Figure 1 comprises an upright longitudinally upwardly tapered mandrel 1, preferably of circular cross section, having a multiplicity of lugs or shoulders 2 projecting outwardly from the periphery thereof and arranged in axially spaced rows and also in spiral spaced relation around the mandrel for directing the weaving of the strands of an open mesh tube 3 which is formed on the mandrel, the lugs of each row being arranged in uniformly spaced relation circumferentially and disposed in the same plane at right angles to the axis of the mandrel, as shown in the drawings.

The diameters of these mandrels and woven wire tubes formed thereon are usually made to conform approximately to the diameters of the cables or other articles to which the woven wire tube is to be applied for drawing the latter endwise or supporting the same.

The length of the mandrel is made to conform more or less closely to the length required for the woven wire tube formed thereon depending somewhat upon the work to be performed by the woven wire tube, said mandrel being usually supported in an upright position for convenience of weaving the strands thereon, preferably from top to bottom.

When the mandrel is tapered, as shown in Figure 1, it is supported vertically with its smaller end uppermost so that when the strands are interwoven around and upon the periphery of the mandrel the smaller end of the open mesh tube will be at the top and will gradually increase in diameter as the weaving continues toward the bottom.

As illustrated the strands which form the expansile and contractile tubular body 3 are arranged in pairs and those of each pair are preferably made of a continuous strand of wire or other suitable material, bent or folded substantially midway between its ends to form a loop adapted to be placed over and upon one of the uppermost shoulders 2 with its opposite sides or ends extending downwardly the full length or below the lower end of the mandrel 1.

That is, the intermediate portions or loops 4 of the strands are preferably hung upon and suspended from the upper circular row of shoulders 2, the opposite sides or ends of each pair being then wound spirally in opposite directions around and upon the periphery of the mandrel 1 and interwoven with the other strands in the manner of braiding or weaving to form an open-mesh tapered tube 3, the crossing portions of the strands being free to move relatively to each other so that when the open-mesh tube is completed it may be expanded radially by endwise compression thereof, or reversely contracted radially by endwise extension.

When the interweaving of the strands is completed around the mandrel, the free ends thereof may be twisted together in pairs as shown in Figure 1 and the ends of the several twisted pairs then returned toward the adjacent end of the woven tube and bound together by a binding wire $a'$, Figure 2, to form a draft eye or loop $a$.

As shown in Figure 2 this draft eye is arranged at one side of the axis of the woven wire tube 3 but obviously the free ends of the strands as shown in Figure 1 may be returned and bent into the form of two or more draft eyes or loops, or, may be formed into a single draft eye coaxial with the axis of the open-mesh tube.

The shoulders 2 are preferably made in the form of lugs projecting outwardly from the periphery of the main body of the mandrel 1 and preferably tapered downwardly or in the same direction as the weaving of the strands upon the mandrel from the small end to the large end thereof, the upper end faces of the several shoulders being preferably formed with concave seats for receiving and temporarily retaining adjacent portions of the strands against accidental displacement during the weaving operation, and thereby assisting in directing the laying of the strands around and upon said mandrel in order to establish a uniform open-mesh strand tube.

The outer faces of the shoulders 2 are inclined downwardly at $2'''$ toward the axis of the mandrel at an angle to said axis and in the direction of weaving of the strands upon the mandrel, the object of which is to facilitate the stripping or endwise displacement of the woven strand tube from the mandrel.

For example, when the open-mesh tube is completed upon the mandrel its lower or larger end is pressed upwardly, thereby expanding the tube radially beyond the outer faces of the shoulders 2 so that the continued upward pressure upon the lower end of the tube will displace the latter upwardly from the mandrel during which operation any portions of the strands which may engage the outer edges of the lugs or shoulders 2 will be thereby deflected outwardly to assure the free upward displacement of the entire tube from the mandrel.

It is evident, however, that instead of displacing the woven mesh tube from the mandrel in the manner described the lower end of the tube may be held by one hand while the mandrel may be withdrawn endwise from the tube in the direction of the larger end thereof.

When the woven strand tube is completed as shown in Figure 2 it may be compressed endwise for expanding the same radially and then placed over and upon a cable or other article A as shown by dotted lines in Figure 2, and then extended endwise to frictionally tighten the same upon the cable to permit the latter to be drawn endwise or suspended from any suitable support through the medium of the draft eye $a$.

In the modification shown in Figures 3 and 4, the mandrel as $1'$ is cylindrical and therefore the open-mesh tube as $3'$ formed thereon will also be cylindrical but otherwise the construction is similar to that shown in Figures 1 and 2.

In Figure 4 the woven strand tube 3' is shown as expanded radially by endwise compression thereof and as partially removed by upward displacement from the mandrel and when the open-mesh tube is thus expanded its interior diameter is obviously greater than the outer diameter of the mandrel across the extreme outer portions of the lugs of the shoulders 2, thus permitting upward displacement of the open-mesh tube with a minimum resistance.

In Figures 5 and 6 I have shown a cylindrical mandrel 1'' for receiving and supporting a multiplicity of lugs or shoulders 2' in the form of L-shaped levers having their shorter arms mounted upon pivotal pins 4 in the adjacent portions of the mandrel 1'' to permit said lugs to swing radially in suitable slots 2'' which are also formed in the outer walls of the mandrel 1''.

That is, the lugs or shoulders 2' are loosely pivoted at 4 to freely swing inwardly and outwardly and, as illustrated, extend outwardly and upwardly from their pivots through the slots 2'' and are provided just outside their pivots with shoulders 7 for engaging the lower walls of the slots 2'' and limiting the outward swinging movement.

The upper ends of the lugs or shoulders 2' are also provided with limiting stops 6 adapted to engage cooperative stops 5 on the upper walls of the slots 2'' for limiting the inward swinging movement of the shoulders.

These stop shoulders are arranged in such manner that when in their outermost positions their outer faces will be inclined upwardly and outwardly in a manner similar to the outer faces of the lugs 2, but when moved to their extreme inward positions these outer faces will be substantially co-incident with the corresponding outer faces of the mandrel 1'' to enable the woven strand tube to be readily removed from the mandrel by upward displacement in which case the contact of the strands of the tube with the outer faces of the shoulders 2' will automatically force said shoulders inwardly to the position shown by dotted lines in Figure 5.

That is, when the shoulders 2' are in their outermost positions they serve the same purpose as the lugs or shoulders 2 in that they direct the laying of the strands spirally around and upon the periphery of the mandrel 1'' but when the woven strand tube is completed the lower end thereof may be pressed upwardly for expanding the tube radially and at the same time causing the strands of the tube to ride against the upwardly inclined faces of the shoulders 2', thereby automatically forcing said shoulders inwardly and permitting free upward displacement of the tube from the mandrel.

The constructions shown and described are particularly simple, practical and highly efficient for the reason that the shoulders 2 and 2' always remain permanently upon the mandrel and permit the woven strand tube to be easily and quickly removed from the mandrel by upward displacement without removing or displacing any of the lugs or shoulders 2 or 2', thereby greatly increasing the output of the completed tubes for a given period of time and also materially reducing the labor required for such operations.

What I claim is:—

1. The herein described method of making tapered woven-strand tubes, consisting in interweaving the strands spirally around and upon the periphery of a tapered mandrel from the small end toward the larger end of said mandrel leaving the crossing portions of the strands free to move relatively to each other to form a correspondingly tapered open-mesh tube, and then pressing the larger end of the tube toward the smaller end for expanding said tube radially and simultaneously displacing the same endwise from the smaller end of the mandrel.

2. An apparatus for forming open-mesh strand tubes comprising a mandrel around which the strands are spirally interwoven and a multiplicity of shoulders arranged spirally around and operatively projecting outwardly from the periphery of the mandrel for directing the laying of the strands, said shoulders being permanently mounted upon the mandrel and movable inwardly from their operative positions to permit endwise displacement of the strand tube from the mandrel.

3. A mandrel for forming woven wire grips comprising an upright circular body member having a multiplicity of rows of lugs projecting outwardly from the periphery thereof in axially spaced relation, the lugs of each row being arranged in the same plane at right angles to the axis of said body member, the portions of the periphery of said body member between the several rows of lugs being continuous circumferentially, said lugs having their outer faces inclined downwardly and inwardly.

4. A mandrel for forming woven strand grips as in claim 3 in which the body member is tapered upwardly to facilitate the stripping of the woven grip from the bottom upwardly.

EDGAR E. KELLEMS.